(12) United States Patent
Yamabe

(10) Patent No.: US 11,801,802 B2
(45) Date of Patent: Oct. 31, 2023

(54) REAR SIDE AIRBAG DEVICE

(71) Applicant: TS TECH CO., LTD., Saitama (JP)

(72) Inventor: Atsushi Yamabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/282,419

(22) PCT Filed: Oct. 2, 2019

(86) PCT No.: PCT/JP2019/038843
§ 371 (c)(1),
(2) Date: Apr. 2, 2021

(87) PCT Pub. No.: WO2020/071397
PCT Pub. Date: Apr. 9, 2020

(65) Prior Publication Data
US 2021/0380066 A1 Dec. 9, 2021

(30) Foreign Application Priority Data
Oct. 4, 2018 (JP) .................. 2018-189384

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/2078* (2013.01)

(58) Field of Classification Search
None
See application file for complete search history.

(56) References Cited

U.S. PATENT DOCUMENTS

| 5,533,750 A | * | 7/1996 | Karlow | B60R 21/201 |
| | | | | 280/730.2 |
| 5,556,127 A | * | 9/1996 | Hurford | B60R 21/2171 |
| | | | | 280/730.2 |
| 5,785,349 A | | 7/1998 | Storey et al. | |

(Continued)

FOREIGN PATENT DOCUMENTS

| JP | H09-104316 | 4/1997 |
| JP | H11-91486 | 4/1999 |

(Continued)

OTHER PUBLICATIONS

Extended European Search Report issued in corresponding Application No. EP 19869253.5, dated May 26, 2021 (8 pages).

(Continued)

*Primary Examiner* — Faye M Fleming
(74) *Attorney, Agent, or Firm* — Dority & Manning, P.A.

(57) ABSTRACT

Provided is a rear side airbag device that can be mounted with ease. A rear side airbag device is located between a vehicle body and a rear seat, and includes an airbag, an inflator configured to supply gas into the airbag, and a mounting bracket to which the inflator is fixed. The mounting bracket includes an inflator mount portion to which the inflator is fixed, and a first anchor portion and a second anchor portion that are to be fixed to other members, whereas the first anchor portion and the second anchor portion are located on a laterally inner side with respect to the inflator mount portion.

10 Claims, 7 Drawing Sheets

(56) References Cited

U.S. PATENT DOCUMENTS

| | | | | |
|---|---|---|---|---|
| 6,089,595 | A | * | 7/2000 | Enders ................. B60R 21/207 280/730.2 |
| 8,226,113 | B2 | * | 7/2012 | Yamashita .......... B60R 21/2171 280/730.2 |
| 8,585,079 | B2 | * | 11/2013 | Gorman ................ B60R 21/207 280/730.2 |
| 2002/0084630 | A1 | * | 7/2002 | Aulbach ............... B60R 21/207 280/728.2 |

FOREIGN PATENT DOCUMENTS

| | | |
|---|---|---|
| JP | H11-192914 | 7/1999 |
| JP | 2009-040328 | 2/2009 |
| JP | 2016-037141 | 3/2016 |
| JP | 2016-120870 | 7/2016 |
| JP | 2017-521306 | 8/2017 |

OTHER PUBLICATIONS

Chinese First Office Action (w/ English translation) for corresponding Chinese Application No. 201980065470.7, dated Jul. 5, 2022, 15 pages.

The International Search Report and Written Opinion Corresponding to Application No. PCT/JP2019/038843 dated Dec. 10, 2019 (17 pages).

* cited by examiner (a)

(b)

REAR SIDE AIRBAG DEVICE

CROSS REFERENCE TO RELATED APPLICATIONS

This application is the U.S. National Stage entry of International Application No. PCT/JP2019/038843 filed under the Patent Cooperation Treaty having a filing date of Oct. 2, 2019, which claims priority to Japanese Patent Application No. 2018-189384 having a filing date of Oct. 4, 2018, which are incorporated herein by reference.

TECHNICAL FIELD

This disclosure relates to a rear side airbag device located between a vehicle body and a rear seat.

BACKGROUND ART

A rear side airbag device which includes an inflator configured to supply gas into an airbag, and a box for fixing the inflator to a vehicle body is hitherto known in the art (see JP 2009-040328 A). Specifically, in this technical scheme, the box includes a bottom wall to which the inflator is fixed, and two brackets to be fixed to the vehicle body. Of the two brackets, one bracket is located on a laterally inner side with respect to the bottom wall, and the other bracket is located on a laterally outer side with respect to the bottom wall.

SUMMARY OF INVENTION

In such prior art where the other bracket of the box is located on a laterally outer side with respect to the bottom wall, however, there would be a complication; for example, when the box is mounted from the interior of the vehicle, the other bracket need be located farther than the bottom wall and thus mounting of the box would be complicate.

It would be desirable to provide a rear side airbag device of which a box (mounting bracket) can be mounted with ease.

A rear side airbag device located between a vehicle body and a rear seat is disclosed. The rear side airbag device comprises an airbag, an inflator configured to supply gas into the airbag, and a mounting bracket to which the inflator is fixed.

The mounting bracket comprises an inflator mount portion to which the inflator is fixed, and a first anchor portion and a second anchor portion that are to be fixed to other members, The first anchor portion and the second anchor portion are located on a laterally inner side with respect to the inflator mount portion.

With this configuration, for example, when the mounting bracket is mounted to the vehicle body from an interior of the vehicle, the first anchor portion and the second anchor portion both located near at hand for an operator are so easy to access that the mounting bracket can be mounted with ease.

In addition, the first anchor portion may be located on a laterally outer side with respect to the second anchor portion.

With this additional feature, for example, when the mounting bracket is mounted to the vehicle body from the interior of the vehicle, the second anchor portion located near at hand, closer than the first anchor portion to the operator, is easier to access so that the second anchor portion can be mounted with increased ease.

The first anchor portion may be located above the inflator, and the second anchor portion may be located below the inflator.

With this feature, the rear side airbag device can be downsized in the front-rear direction more effectively in comparison with an alternative configuration in which the first anchor portion and the second anchor portion are located at the front and the rear of the inflator.

The mounting bracket may comprise an upper wall located over an airbag module including the airbag and the inflator, and a lower wall located under the airbag module.

With this additional configuration, excessive upward and downward deployment of the airbag can be restricted.

The upper wall and the lower wall may have shapes with widths thereof oriented in a front-rear direction narrower than a width of the airbag module oriented in the front-rear direction.

With this configuration, in which the front-rear widths of the upper wall and the lower wall are narrower than the front-rear width of the airbag module, a weight reduction of the mounting bracket can be expected.

The first anchor portion and the second anchor portion may have shapes with widths thereof oriented in a front-rear direction narrower than a width of the airbag module oriented in the front-rear direction.

With this configuration, in which the front-rear widths of the first anchor portion and the second anchor portion are narrower than the front-rear width of the airbag module, a weight reduction of the mounting bracket can be expected.

The inflator mount portion may have a shape with a width thereof oriented in a front-rear direction narrower than a width of the airbag module oriented in the front-rear direction.

With this configuration, in which the front-rear width of the inflator mount portion is narrower than the front-rear width of the airbag module, a weight reduction of the mounting bracket can be expected.

DESCRIPTION OF EMBODIMENTS

Figure 1:
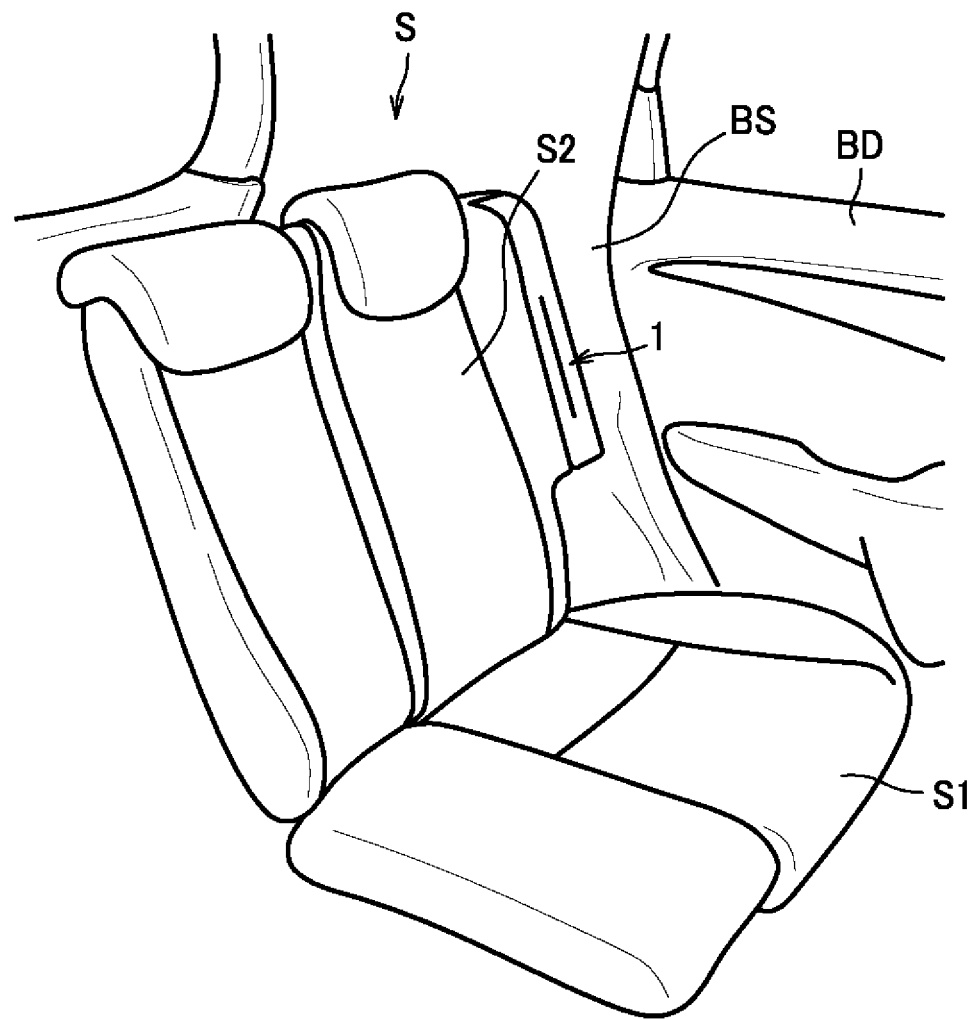
FIG. 1 shows a vehicle in which a rear side airbag device is provided, as viewed from an interior of the vehicle.

Hereinafter, a detailed description will be given of an illustrative, non-limiting embodiment of a rear side airbag device with reference made to accompanying drawings where appropriate. As shown in FIG. 1, a rear side airbag device 1 is a device applied to a rear seat of an automobile, and is located between a rear seat S and a sidewall BS of a vehicle body.

The rear seat S includes a seat cushion 51 and a seat back S2, and the seat back S2 is rotatable about an axis provided at a lower end thereof so that it is tiltable frontward. The rear side airbag device 1 is fixed to the sidewall BS, and not fixed to the seat back S2. Therefore, when the seat back S2 is tilted frontward, the rear side airbag device 1 remains on the sidewall BS and gets exposed, though not illustrated. The rear side airbag device 1 has a front surface flush substantially with a front surface of the seat back S2, and thus looks as if it is a part of the seat back S2 when the rear seat S is in normal use position. Although the rear side airbag device 1 described herein in accordance with this embodiment is one which is installed on the left-hand side within the vehicle body (at the left side of the rear seat S), it is to be understood that a rear side airbag device having a reverse configuration as a mirror image of the illustrated configuration may be provided on the right-hand side within the vehicle body. In describing the present embodiment, unless otherwise noted, the terms "laterally inner side (laterally inward)" or "laterally outer side (laterally outward)" are used to indicate relative positions or directions, not with respect to the rear side airbag device 1 itself, but with respect to the vehicle body. In other words, "inner side" refers to a position closer to the center in the lateral direction within the vehicle body, and "outer side" refers to a position farther from the center in the lateral direction within the vehicle body. On the other hand, the term "front-rear direction" is used to indicate, unless otherwise noted, the front-rear direction as defined with respect to the rear seat S.

Figure 2:
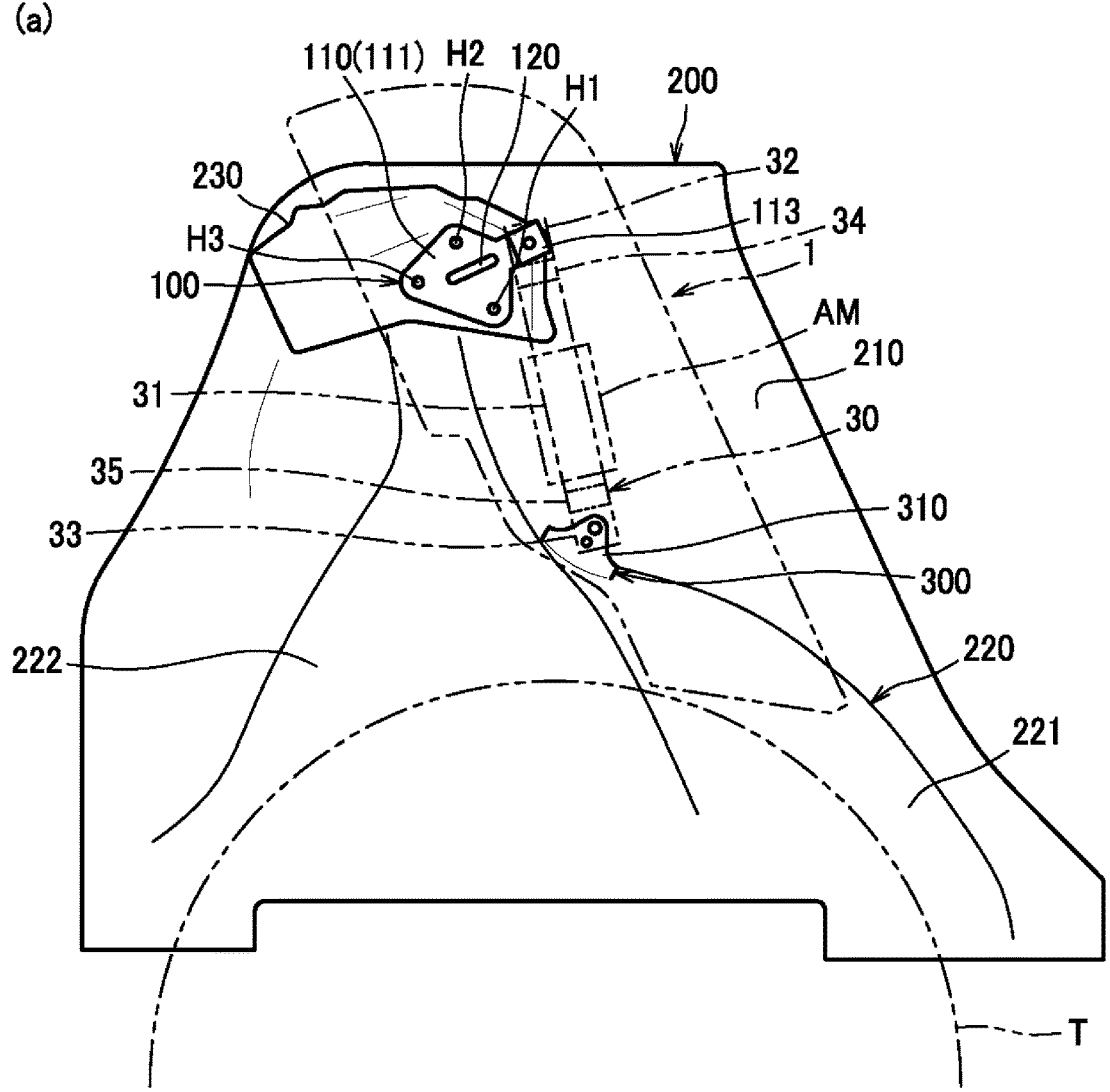
FIG. 2 includes (a) a side view showing relative arrangement of a side panel, a striker and the rear side airbag device as viewed from the interior of the vehicle; and (b) a view of the striker as viewed from above.
Figure 2:
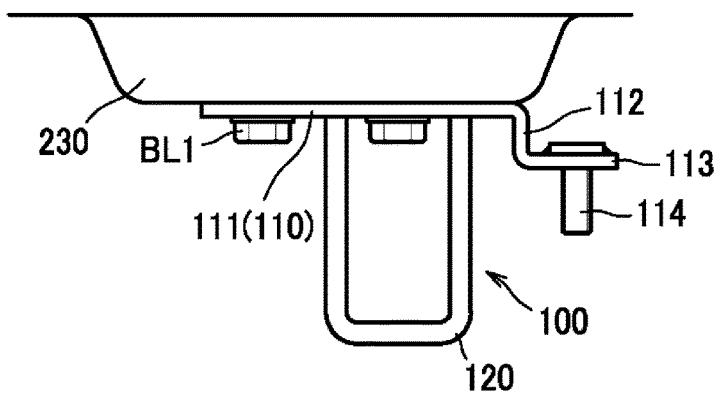

As shown in FIG. 2, the vehicle body includes a side panel 200 that constitutes the sidewall BS. The side panel 200 is made of metal, and includes a sidewall portion 210 forming the sidewall BS, a wheel housing 220 bulging from the sidewall portion 210 laterally inward, and a striker mount portion 230. The wheel housing 220 is a portion for housing a tire T, and includes a first portion 221 and a second portion 222.

The first portion 221 is located in a position corresponding to a front upper portion of the tire T, and is shaped to follow the contour of the front upper portion of the tire T. The second portion 222 is located in a position corresponding to a rear upper portion of the tire T, and bulges laterally inward relative to the first portion 221. The second portion 222 spans a lower part and an upper part in the side panel 200. The second portion 222 has varying widths in the front-rear direction narrower in the upper part than in the lower part. An L-shaped bracket 300 via which to mount the rear side airbag device 1 to the vehicle body is welded or otherwise fixed on a front side surface of the lower part of the second portion 222.

Figure 3:
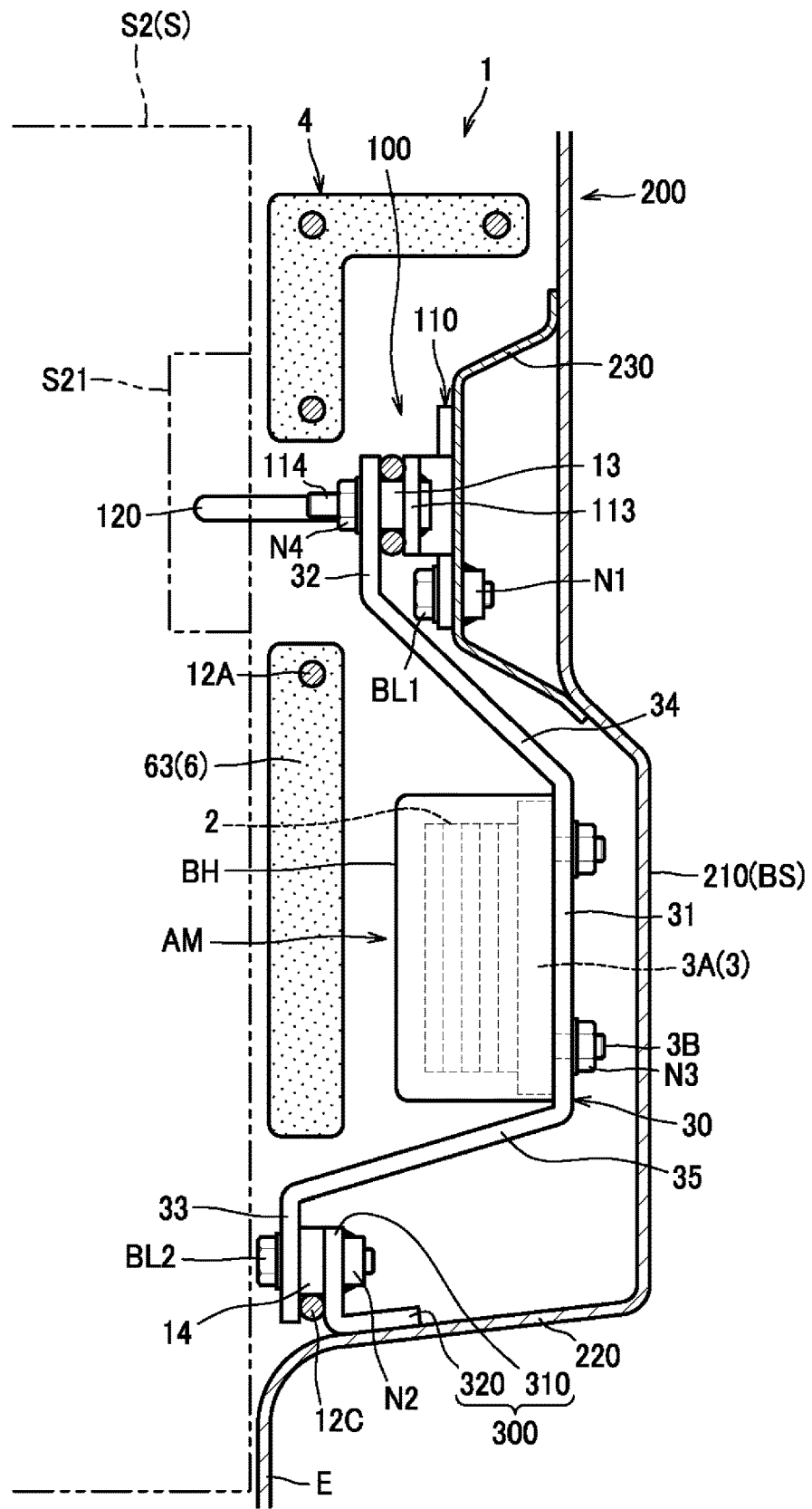
FIG. 3 is a section view showing an internal structure of the rear side airbag device.

As shown in FIG. 3, the L-shaped bracket 300 includes a first plate portion 310 having a shape of a plate of which sides are perpendicular to the lateral direction, and a second plate portion 320 extending from a rear end of the first plate portion 310 laterally outward and to be fixed to the wheel housing 220. The first plate portion 310 of the L-shaped bracket 300 has formed therein a hole (reference character omitted) in which a bolt BL2 for fastening the rear side airbag device 1 to the vehicle body is to be inserted.

As shown in FIG. 2(a), the striker mount portion 230 is a portion that provides a mount surface on which a striker 100 for retaining the seat back S2 in an upright position is mounted; it is so arranged as to cover an upper end portion of the second portion 222, and welded or otherwise joined integrally with an upper portion of the side panel 200.

The striker 100 includes a base bracket 110 to be fixed to the striker mount portion 230, and a U-shaped striker shaft 120 protruding from the base bracket 110 laterally inward. As shown in FIG. 2(a), (b), the base bracket 110 is a plate member and includes a base portion 111 to be attached to the striker mount portion 230, an extension portion 112 extending from a front end of the base portion 111 laterally inward, and a fixing target portion 113 extending from a laterally inner end of the extension portion 112 frontward.

The base portion 111 has a shape of a trapezoid or trapezium of which an upper base is shorter than a lower base as viewed from a laterally inner side, and is positioned with the upper and lower bases inclined with respect to the front-rear direction, and fastened to the striker mount portion 230 with three bolts BL1 (see FIG. 3). That is, the base bracket 110 is fastened to the vehicle body (striker mount portion 230) at a plurality of fastening points.

The base portion 111 has a first hole H1, a second hole H2, and a third hole H3 through which bolts BL1 are to be inserted respectively. The first hole H1 is located in the frontmost and lowermost position among the plurality of holes H1-H3. To be more specific, the first hole H1 is to formed in the lower front corner of the trapezoidal base portion 111.

The second hole H2 is located in the uppermost position among the plurality of holes H1-H3. To be more specific, the second hole H2 is formed in the upper rear corner of the trapezoidal base portion 111.

The third hole H3 is located in the rearmost position among the plurality of holes H1-H3. To be more specific, the third hole H3 is formed in the lower rear corner of the trapezoidal base portion 111.

The extension portion 112 extends from the upper front corner of the trapezoidal base portion 111 laterally inward. The fixing target portion 113 is a portion to which a mounting bracket 30, which will be described later, of the rear side airbag device 1 is fixed, and has sides perpendicular to the lateral direction. The fixing target portion 113 is formed on the laterally inner end of the extension portion 112, and is thus located in a position shifted laterally inward, i.e., to a direction of protrusion of the striker shaft 120, with respect to the base portion 111.

The fixing target portion 113 includes a bolt portion 114 protruding from a laterally inner side surface thereof laterally inward. The extreme end of the bolt portion 114 points laterally inward, i.e., toward a protruding direction of the striker shaft 120.

The rear side airbag device 1 is so located as to overlap the striker 100 and the L-shaped bracket 300 as viewed from the left or right. The rear side airbag device 1 is fixed to the side panel 200 by using the bolt portion 114 of the striker 100 and the hole of the L-shaped bracket 300.

To be more specific, the striker mount portion 230 has holes (not shown) provided in positions corresponding to the holes H1-H3. As shown in FIG. 3, nuts N1 in which bolts BL1 for fastening the base bracket 110 to the striker mount portion 230 are screwed and engaged are welded or otherwise fixed on a reverse side (laterally outer side), at portions corresponding to the holes, of the striker mount portion 230. Similarly, on a reverse side (laterally outer side), at a portion corresponding to the hole, of the L-shaped bracket 300, as well, a nut N2 in which a bolt BL2 for fastening the rear side airbag device 1 to the L-shaped bracket 300 is screwed and engaged are welded or otherwise fixed.

When the rear side airbag device 1 has been attached to the vehicle body, the striker shaft 120 of the striker 100 protrudes from a laterally inside surface of the rear side airbag device 1. It is to be understood that, in FIG. 3, the showing of an outer covering member 7, which will be described later, of the rear side airbag device 1 is omitted.

In the seat back S2 of the rear seat S, a latch mechanism S21 engageable with the striker to shaft 120 of the striker 100 is provided. With this feature, when the seat back S2 folded down on the seat cushion 51 is pulled up, the latch mechanism S21 engages with the striker shaft 120 of the striker 100, so that the seat back S2 is locked in its upright position.

Figure 4:
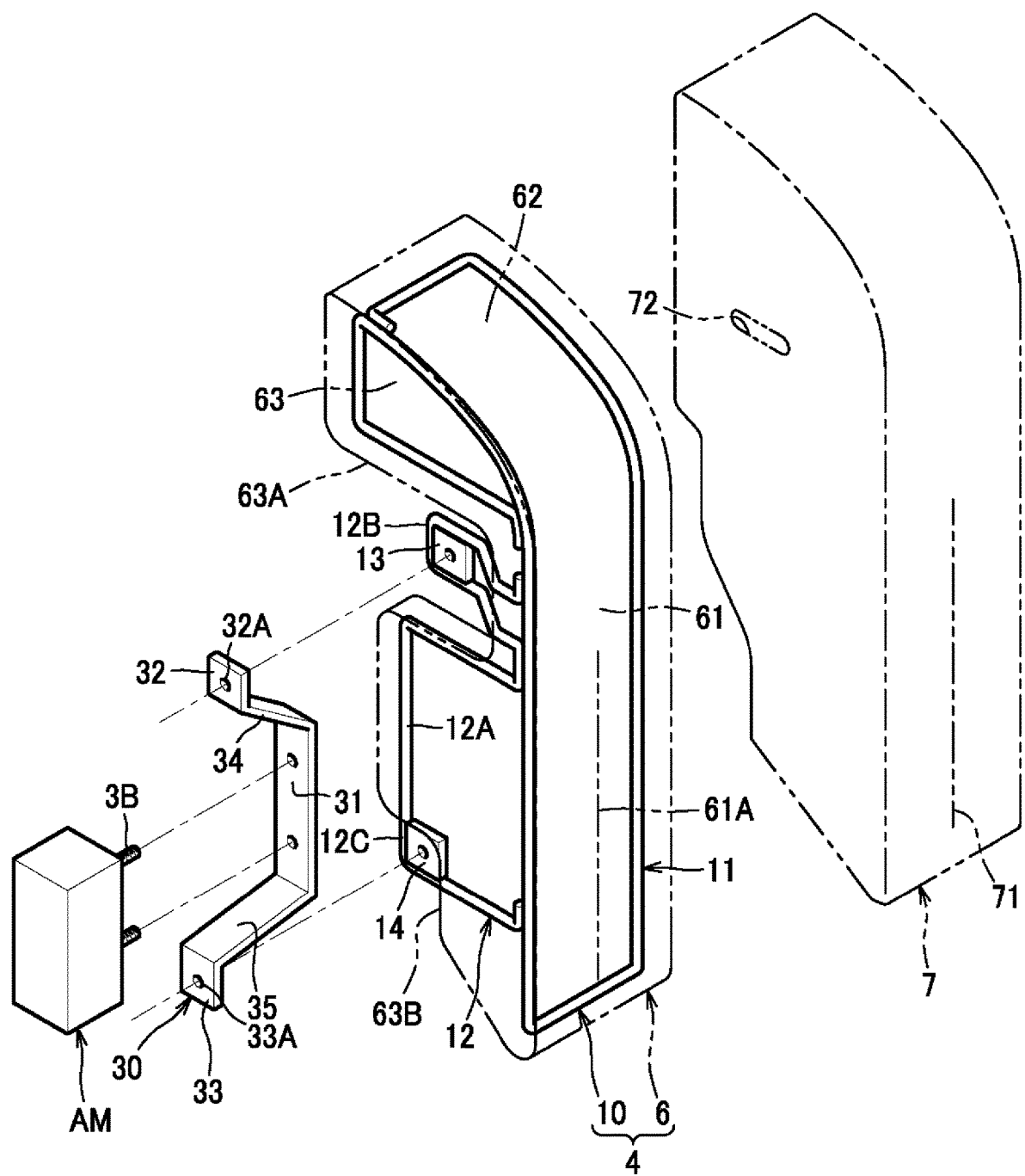
FIG. 4 is an exploded perspective view of the rear side airbag device.

As shown in FIG. 4, the rear side airbag device 1 comprises an airbag module AM, a mounting bracket 30, a base member 4, and an outer covering member 7.

As shown in FIG. 3, the airbag module AM includes an airbag 2, an inflator 3, and a storage bag BH in which the airbag 2 and the inflator 3 are stored.

The airbag 2 is a member which inflates with gas supplied inside and deploys in a collision of a vehicle as known in the art. The airbag 2 is folded and stored in the storage bag BH.

The inflator 3 is a member configured to supply gas into the airbag 2. The inflator 3 includes a cylindrical main body 3A and bolt portions 3B provided protrusively from the main body 3A. A plurality of (two, in this embodiment) bolt portions 3B are arranged along an axis of the main body 3A, and each bolt portion 3B is oriented toward the axis of the main body 3A and fixed to the main body 3A. Each bolt portion 3B protrudes out of the storage bag BH.

As shown in FIG. 4, the base member 4 is a member that is configured to accommodate the airbag 2 and the inflator 3, and to be fixed to the vehicle body (side panel 200, in this embodiment). The base member 4 includes a wire frame 10, and a cushion pad 6 formed integrally with the wire frame 10.

The cushion pad 6 is made of urethane foam, etc., and includes a front wall 61, an upper wall 62 extending from an upper end of the front wall 61 rearward, and a side wall 63 located adjacent to laterally inner side edges of the front wall 61 and the upper wall 62. Each of the walls 61-63 is formed in a shape of a plate. The front wall 61 has formed therein a slit 61A allowing the airbag 2 to deploy frontward.

The side wall 63 has a first indentation 63A and a second indentation 63B. The first indentation 63A is a cutaway part through which to allow the striker shaft 120 of the striker 100 (see FIG. 3) to protrude from the laterally outer side to the laterally inner side and to expose a first fixing plate 13 which will be described later, and is formed in a position corresponding to space accommodating the first fixing plate 13, etc. The second indentation 63B is a cutaway part through which to expose a second fixing plate 14 which will be described later, and is formed in a position corresponding to space for accommodating the second fixing plate 14.

The base member 4 is covered with the outer covering member 7 made of synthetic leather, fabrics, etc. The outer covering member 7 is shaped to cover the upper, laterally inner and front sides of the base member 4. The front portion of the outer covering member 7 has a fragile region 71 formed in a position corresponding to the slit 61A of the cushion pad 6 to allow the airbag 2 to deploy frontward. The fragile region 71 is formed, for example, by sewing up a slit. The laterally inner portion of the outer covering member 7 has formed therein a hole 72 through which to allow the striker shaft 120 of the striker 100 (see FIG. 3) to protrude from the laterally outer side to the laterally inner side.

The wire frame 10 is made up of a first wire 11 and a second wire 12 made of metal, shaped generally along the contour (edges of respective walls 61-63) of the cushion pad 6, and welded or otherwise joined together. In the present embodiment, two wires 11, 12 are provided to form the wire frame 10; however, the number of wires that form the wire frame 10 may be one, three or more, instead.

The first wire 11 is located inside the cushion pad 6, and shaped along the contours of the front wall 61, the upper wall 62, and the upper portion of the side wall 63 (portion above the first indentation 63A) of the cushion pad 6. The second wire 12 includes a pad support portion 12A which is located inside the cushion pad 6, and a first exposed portion 12B and a second exposed portion 12C which are located outside the cushion pad 6.

The pad support portion 12A is shaped generally along the contour of the lower portion of the side wall 63 (portion under the first indentation 63A) of the cushion pad 6.

The first exposed portion 12B is formed in a shape of a letter U which opens frontward, and provided with a rectangular first fixing plate 13 welded or otherwise fixed to an inside thereof. Specifically, the three sides of the first fixing plate 13 are welded or otherwise joined to the bottom and sides, respectively, of the U-shaped first exposed portion 12B.

As shown in FIG. 3, the first fixing plate 13 is a portion fixed to the fixing target portion 113 of the striker 100 described above, and has a hole (reference character omitted) through which a bolt portion 114 of the fixing target portion 113 is to be inserted. The first fixing plate 13 is located on a laterally outer side with respect to the pad support portion 12A (second fixing plate 14 which will be described later). Accordingly, as shown in FIG. 4, the first exposed portion 12B is bent laterally outward from the pad support portion 12A such that the U-shaped portion for supporting the first fixing plate 13 is located on the laterally outer side with respect to the pad support portion 12A.

The second exposed portion 12C is an L-shaped portion, and includes a first rod portion extending in the upward-downward direction, and a second rod portion extending from a lower end of the first rod portion frontward. A rectangular second fixing plate 14 is welded or otherwise fixed to the second exposed portion 12C. Specifically, the two sides of the second fixing plate 14 are welded or otherwise joined to the first rod portion and the second rod portion, respectively.

As shown in FIG. 3, the second fixing plate 14 is a portion fastened to the L-shaped bracket 300 with the bolt BL2 described above, and has a hole (reference character omitted) through which the bolt BL2 is to be inserted.

The mounting bracket 30 is a member for mounting the airbag module AM to the base member 4, and is made of sheet metal. The mounting bracket 30 includes an inflator mount portion 31, a first anchor portion 32, a second anchor portion 33, a first connecting portion 34 as an example of an upper wall, and a second connecting portion 35 as an example of a lower wall. As shown in FIG. 2(a), the mounting bracket 30 is formed with its width in the front-rear direction narrower than a width of the airbag module AM in the front-rear direction. To be more specific, the inflator mount portion 31, the first anchor portion 32, the second anchor portion 33, the first connecting portion 34 and the second connecting portion 35 are formed with their widths in the front-rear direction narrower than the width of the airbag module AM in the front-rear direction.

As shown in FIG. 3, the inflator mount portion 31 is a portion to which the inflator is to be fixed, and has two holes (reference characters omitted) in which the bolt portions 3B of the inflator 3 are inserted, respectively. The inflator mount portion 31 is a plate-shaped portion the sides of which are perpendicular to the lateral direction and through which the holes pierce and extend in the lateral direction. The respective bolt portions 3B of the inflator 3 are inserted from the laterally inner side in the corresponding holes, and protrude laterally outward of the inflator mount portion 31. Nuts N3 are then applied to the bolt portions 3B, and the bolt portions 3B with their ends oriented laterally outward are fastened to the inflator mount portion 31.

Once the inflator 3 is mounted to the inflator mount portion 31 as described above, the inflator mount portion 31 is located between the main body 3A of the inflator 3 and the sidewall portion 210 that forms the sidewall SB of the vehicle body, which are arranged in the lateral direction.

The first anchor portion 32 is a portion to be fixed to the fixing target portion 113 of the base bracket 110 of the striker 100 mounted to the striker mount portion 230, and has a hole 32A (see FIG. 4) in which the bolt portion 114 of the fixing target portion 113 is to be inserted. The first anchor portion 32 is a plate-shaped portion the sides of which are perpendicular to the lateral direction and through which the hole 32A pierces and extends in the lateral direction. The bolt portion 114 is inserted from the laterally outer side in the holes of the first anchor portion 32 and the first fixing plate 13, and protrudes from the first anchor portion 32 laterally outward. A nut N4 is then applied to the bolt portion 114, and the first anchor portion 32 and the first fixing plate 13 are fastened to the fixing target portion 113.

The first anchor portion 32 is located above the inflator 3 and the inflator mount portion 31. The first anchor portion 32 is located on a laterally inner side with respect to the inflator mount portion 31, specifically, on a laterally inner side with respect to the inflator 3.

The second anchor portion 33 is a portion to be fixed to the L-shaped bracket 300, and has a hole 33A (see FIG. 4) in which the bolt BL2 is to be inserted. The second anchor portion 33 is a plate-shaped portion the sides of which are perpendicular to the lateral direction and through which the hole 33A pierces and extends in the lateral direction. The bolt BL2 is inserted from the laterally inner side through the holes of the second anchor portion 33 and the L-shaped bracket 300, and the bolt BL2 with its end oriented laterally outward is fastened to the nut N2 joined to the L-shaped bracket 300. In other words, the inflator mount portion 31, the first anchor portion 32, and the second anchor portion 33 are arranged relative to and fastened to their fixing target members in the lateral direction.

The second anchor portion 33 is located below the inflator 3 and the inflator mount portion 31. The second anchor portion 33 is located on a laterally inner side with respect to the inflator mount portion 31, specifically, on a laterally inner side with respect to the inflator 3, more specifically, on a laterally inner side with respect to the first anchor portion 32.

The inflator 3 is located on a laterally outer side with respect to a laterally inner end E of the wheel housing 220. The airbag module AM and the mounting bracket 30 are also located on the laterally outer side with respect to the laterally inner end E of the wheel housing 220.

The first connecting portion 34 is a portion connecting the inflator mount portion 31 and the first anchor portion 32, and located over the airbag module AM. The first connecting portion 34 is sloped with respect to the lateral direction, and extends from an upper end of the inflator mount portion 31 in a laterally-inward-and-obliquely-upward direction.

The second connecting portion 35 is a portion connecting the inflator mount portion 31 and the second anchor portion 33, and located under the airbag module AM. The second connecting portion 35 is sloped with respect to the lateral direction, and extends from a lower end of the inflator mount portion 31 in a laterally-inward-and-obliquely-downward direction.

In a state, as shown in FIG. 2, where the mounting bracket 30 has been attached to the side panel 200, the mounting bracket 30 is located directly above the wheel housing 220.

It is understood that in a state, as shown in FIG. 2, where the rear side airbag device 1 has been attached to the vehicle body, the second portion 222 of the side panel 200 is located in a position rearward of the airbag module AM. With this arrangement, the airbag 2 is restrained from deploying rearward.

Next, a description will be given of methods of manufacturing, and attaching to the side panel 200, the rear side airbag device 1.

As shown in FIG. 4, a wire frame 10 is made by welding, and inserted in a mold, in which a cushion pad 6 is formed integrally with the wire frame 10. An airbag module AM is fixed to the mounting bracket 30, and put in the inside of the base member 4.

To be more specific, the mounting bracket 30 to which the airbag module AM is fixed is temporarily retained for assembly in the cushion pad 6 by passing the second anchor portion 33 of the mounting bracket 30 through between the cushion pad 6 and the second fixing plate 14 to the laterally inner side while retaining the first connecting portion 34 of the mounting bracket 30 between the lower end of the first indentation 63A of the cushion pad 6 and the first exposed portion 12B, so that the respective anchor portions 32, 33 are laid on the corresponding fixing plates 13, 14.

Thereafter, an outer covering member 7 is put over the base member 4, and temporarily retained on the base member 4 for assembly. It is to be understood that the outer covering member 7 may be attached to the base member 4 by engaging hooks (not shown) provided at ends of the outer covering member 7 with engageable parts (not shown) provided on the base member 4. Through the process steps described above, the rear side airbag device 1 is made.

To attach the rear side airbag device 1 to the side panel 200, first, as shown in FIG. 2, the striker 100 and the L-shaped bracket 300 are fixed to the side panel 200 beforehand. In the operation of attaching the rear side airbag device 1, first, the first anchor portion 32 of the mounting bracket 30 is attached to the bolt portion 114 of the striker 114 by passing the bolt portion 114 of the striker 100 through the hole 32A (see FIG. 4) of the first anchor portion 32; at the same time, the hole 33A (see FIG. 4) of the second anchor portion 33 is aligned with the hole of the L-shaped bracket 300.

In this operation, the laterally inside portion of the temporarily attached outer covering member 7 has been tucked up so that the respective anchor portions 32, 33 can be seen from the laterally inner side.

Thereafter, as shown in FIG. 3, the anchor portions 32, 33 are fastened to the base bracket 110 and the L-shaped bracket 300, respectively, with the nut N4 and the bolt BL2. The tucked-up laterally inside portion of the outer covering member 7 is then untucked to cover the base member 4, with the result that the rear side airbag device 1 is attached to the side panel 200.

With the rear side airbag device 1 according to the present embodiment as described above, the following advantageous effects can be achieved.

Since the mounting bracket 30 is located by utilizing a space directly above the wheel housing 220, the mounting bracket 30 can be located in an appropriate position with consideration given to the shape of the vehicle body.

Since the inflator 3 is located on a laterally outer side with respect to the laterally inner end E of the wheel housing 220, the inflator 3 in its entirety can be located within a space directly above the wheel housing 220, so that the space can be utilized effectively.

Since the inflator mount portion 31 is located between the inflator 3 and the sidewall BS of the vehicle body arranged in the lateral direction, the airbag 2 can be restrained from deploying toward the sidewall BS of the vehicle body. Accordingly, the airbag 2 can be restrained from getting hitched, for example, on weld beads or the like formed on the sidewall BS, so that the airbag 2 can be caused to deploy stably.

Since the end of the bolt portion 3B of the inflator 3 is oriented laterally outward, i.e., the bolt portion 3B is laterally oriented, the rear side airbag device 1 can be downsized in the front-rear direction in comparison, for example, with an alternative configuration in which the bolt portion is arranged along the front-rear direction.

Since the first anchor portion 32 and the second anchor portion 33 of the mounting bracket 30 are located above and below the inflator 3, the rear side airbag device 1 can be downsized in the front-rear direction in comparison, for example, with an alternative configuration in which the first anchor portion and the second anchor portion are located in front and in the rear of the inflator.

Since the first anchor portion 32 and the second anchor portion 33 are located at a laterally inner side with respect to the inflator mount portion 31, the first anchor portion 32 and the second anchor portion 33 are both located near at hand for the operator who is about to mount the mounting bracket 30 to the vehicle body from an interior of the vehicle, and are so easy to access that the mounting bracket 30 can be mounted with ease.

Since the inflator mount portion 31, the first anchor portion 32, and the second anchor portion 33 are arranged relative to and fastened to their fixing target members in the lateral direction, the rear side airbag device 1 can be downsized in the front-rear direction in comparison, for example, with an alternative configuration in which they are arranged relative to and fastened to the corresponding fixing targets in the front-rear direction.

Since the connecting portions 34, 35 of the mounting bracket 30 are located over and under the airbag module AM, respectively, excessive upward and downward deployment of the airbag 2 can be restricted.

Since the mounting bracket 30 is mounted to the base bracket 110 of the striker 100 attached to the vehicle body, no additional mounting spot for the mounting bracket 30 need be provided.

Since the hole 32A for the bolt portion 114 of the base bracket 110 to be inserted therein is provided in the first anchor portion 32, the mounting bracket 30 can be retained temporarily to the vehicle body for assembly with ease by simply attaching the first anchor portion 32 to the bolt portion 114 of the base bracket 110 attached to the vehicle body.

Since the end of the bolt portion 114 of the base bracket 110 is oriented in a direction of protrusion of the striker shaft 120, the first anchor portion 32 of the mounting bracket 30 can be mounted easily to the bolt portion 114 from the interior of the vehicle.

Since the fixing target portion 113 is located in a position shifted relative to the base portion 111 in the direction of protrusion of the striker shaft 120, the fixing target portion 113 is located nearer at hand for the operator who is about to mount the mounting bracket 30 to the base bracket 110 from an interior of the vehicle, and is so easy to access that the mounting bracket 30 can be mounted with ease.

With the illustrated configurations, the inflator mount portion 31, the first anchor portion 32, the second anchor portion 33, the first connecting portion 34, and the second connecting portion 35 have widths oriented in the front-rear direction narrower than the width of the airbag module AM in the front-rear direction, so that the mounting bracket 30 can be made lighter in weight.

The rear side airbag device according to one exemplary embodiment as described above may be modified where appropriate in a practicable application, as illustrated in other configurations described below. In the following description, the members having substantially the same structural features as those of the above-described embodiment will be designated by the same reference characters, and an explanation thereof will be omitted.

Figure 5:
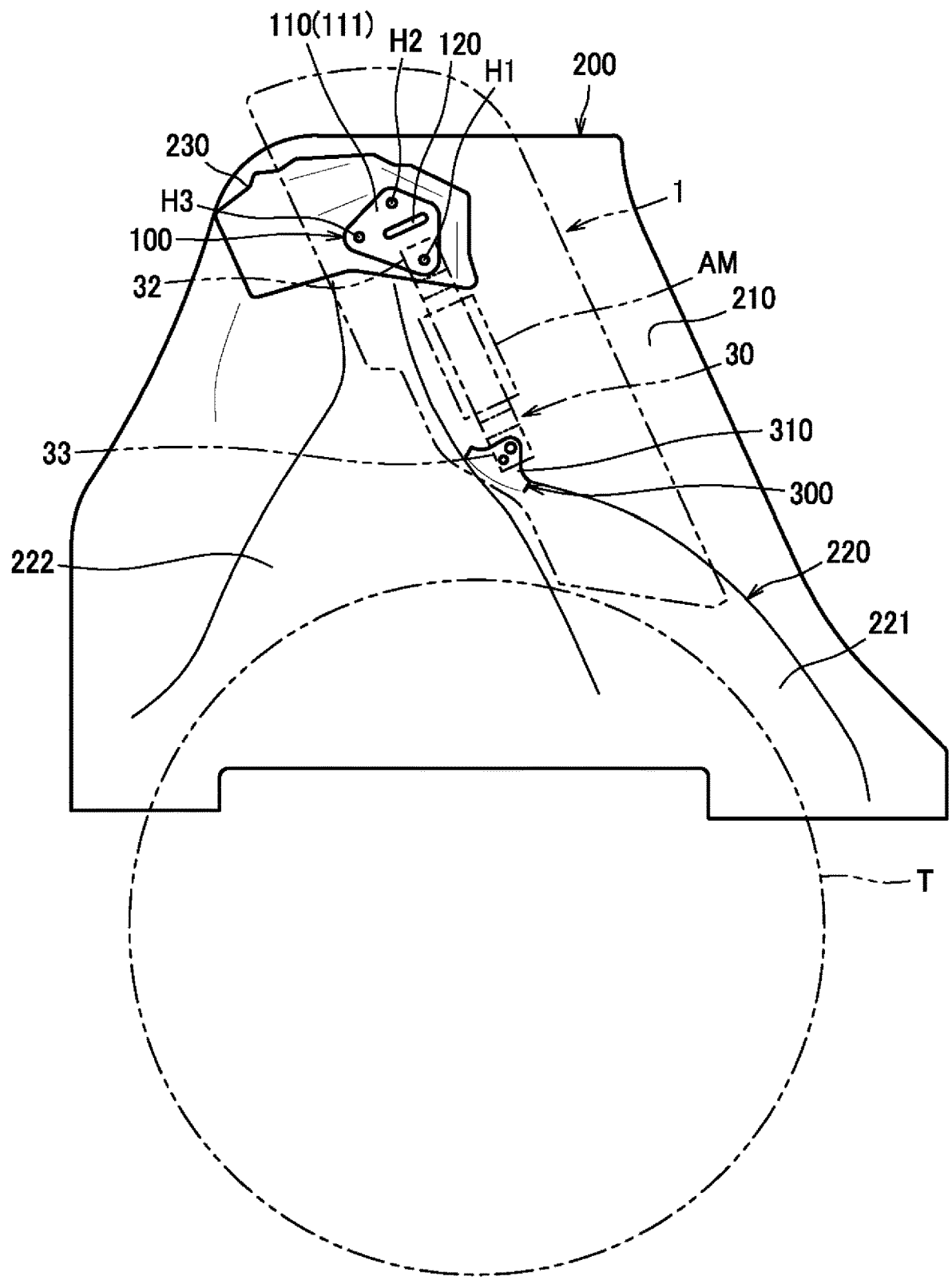
FIG. 5 is a side view of a base bracket and a rear side airbag device, showing a first modified example.
Figure 6:
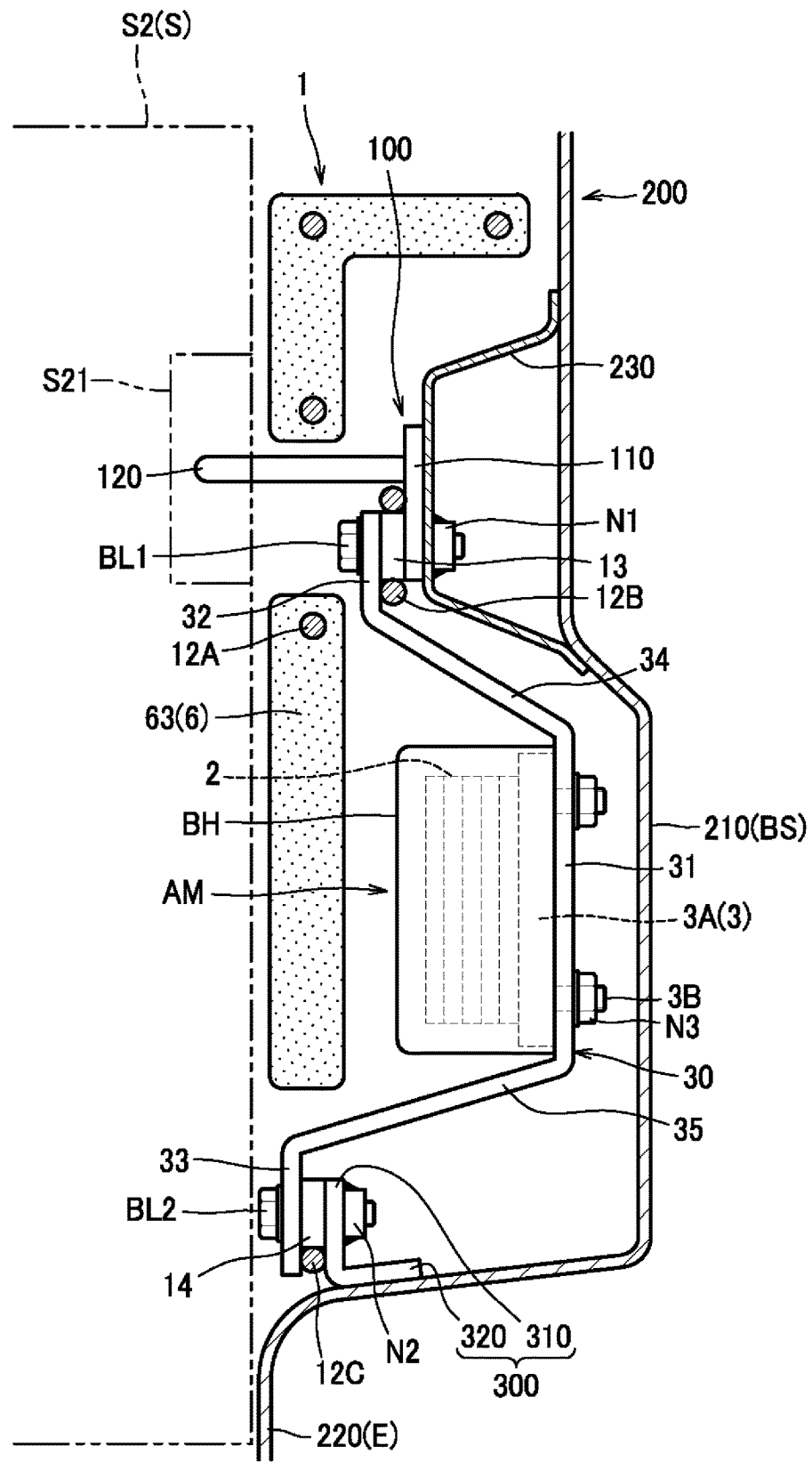
FIG. 6 is a section view showing an internal structure of the rear side airbag device configured according to the first modified example.

In the above-described embodiment, the first anchor portion 32 of the mounting bracket 30 is fastened to the base bracket 110; instead, the first anchor portion 32 may, for example, be fastened together with the base bracket 110 to the vehicle body, as shown in FIGS. 5 and 6.

To be more specific, in this embodiment, the base bracket 110 of the striker 100 consists of the aforementioned base portion 111 only. The rear side airbag device 1 has substantially the same structure, though there exist some differences associated with the change in the shape of the base bracket 110, and thus a detailed explanation thereof will be omitted.

In this embodiment, the rear side airbag device 1 is fastened to the striker mount portion 230 and the L-shaped bracket 300 by utilizing the first hole H1 of the striker 100 and the hole of the L-shaped bracket 300. Specifically, as shown in FIG. 6, the first anchor portion 32 is fastened together with the first fixing plate 13 and the base bracket 110 to the striker mount portion 230 (vehicle body) with the bolt BL1. In this state, the first anchor portion 32 cooperates with the striker mount portion 230 and holds therebetween the first fixing plate 13 and the base bracket 110. That is, in this embodiment, the hole 32A of the first anchor portion 32 and the hole of the first fixing plate 13 are utilized as holes for the bolt BL1 to be inserted therein. The bolt BL1 is inserted from the laterally inner side into the holes of the first anchor portion 32, the first fixing plate 13, the base bracket 110, and the striker mount portion 230, and its end directed laterally outward is fastened in the nut N1 joined to the striker mount portion 230.

As shown in FIG. 5, the second anchor portion 33 of the mounting bracket 30 in the rear side airbag device 1 mounted in the vehicle body is located more to the front than the first anchor portion 33 is.

The first anchor portion 32 is fastened to the striker mount portion 230 by utilizing the first hole H1 located in the frontmost and lowermost position among the three holes H1-H3 of the base bracket 110. In other words, the first anchor portion 32 is fastened together with the base bracket 110 at the frontmost and lowermost fastening point among a plurality of fastening points of the base bracket 110.

Next, a description will be given of a method of attaching the rear side airbag device 1 to the side panel 200. It is to be understood that the manufacturing method of the rear side airbag device is similar to that of the above-described embodiment.

To attach the rear side airbag device 1 to the side panel 200, first, as shown in FIG. 5, the holes of the anchor portions 32, 33 of the mounting bracket 30 of the rear side airbag device 1 are aligned with the first hole H1 of the base bracket 110 and the hole of the L-shaped bracket 300, respectively.

In this operation, the laterally inside portion of the temporarily attached outer covering member 7 has been tucked up so that the respective anchor portions 32, 33 can be seen from the laterally inner side. The striker 100 and the L-shaped bracket 300 are fixed beforehand to the side panel 200. For the striker 100, the base bracket 110 is fastened to the side panel 200 only at two fastening points, i.e., the second hole H2 and the third hole H3; the first hole H1 is left without the bolt BL1.

Thereafter, as shown in FIG. 6, the anchor portions 32, 33 are fastened to the striker mount portion 230 and the L-shaped bracket 300, respectively, with the bolts BL1, BL2. The tucked-up laterally inside portion of the outer covering member 7 is then untucked to cover the base member 4, with the result that the rear side airbag device 1 is attached to the side panel 200.

According to this embodiment as described above, the following advantageous effects can be achieved.

Since the first anchor portion 32 is fastened together with the base bracket 110 to the vehicle body, the number of steps for the fastening work can be reduced as compared to the above-described embodiment.

Since the first anchor portion 32 is fastened together with the base bracket 110 to the vehicle body at the frontmost one of a plurality of fastening points of the base bracket 110 fastened to the vehicle body, the distance from the first anchor portion 32 to the second anchor portion 33, i.e., the length of the mounting bracket 30, can be made shorter than that of an alternative configuration in which any other fastening point is used for fastening.

Since the first anchor portion 32 is fastened together with the base bracket 110 to the vehicle body at the lowermost one of a plurality of fastening points of the base bracket 110 fastened to the vehicle body, the distance from the first anchor portion 32 to the second anchor portion 33, i.e., the length of the mounting bracket 30, can be made shorter than that of an alternative configuration in which any other fastening point is used for fastening.

Since the first anchor portion 32 and the vehicle body are configured to hold the base bracket 110 therebetween, the mounting bracket 30 is attached to a part made up of the vehicle body and the base bracket 110 overlapping one another and thus provided with increased rigidity, so that the mounting bracket 30 can be attached firmly to the base bracket 110.

It is to be understood that the structures of the mounting bracket, the cushion pad and other features may be modified where appropriate according to the shape of the vehicle body, or the like. Depending on the shape of the vehicle body, the striker 100 would become visible to a passenger from the rear side when the tail gate of the vehicle has been opened, and thus disadvantageously impair the aesthetics in interior design.

Figure 7:
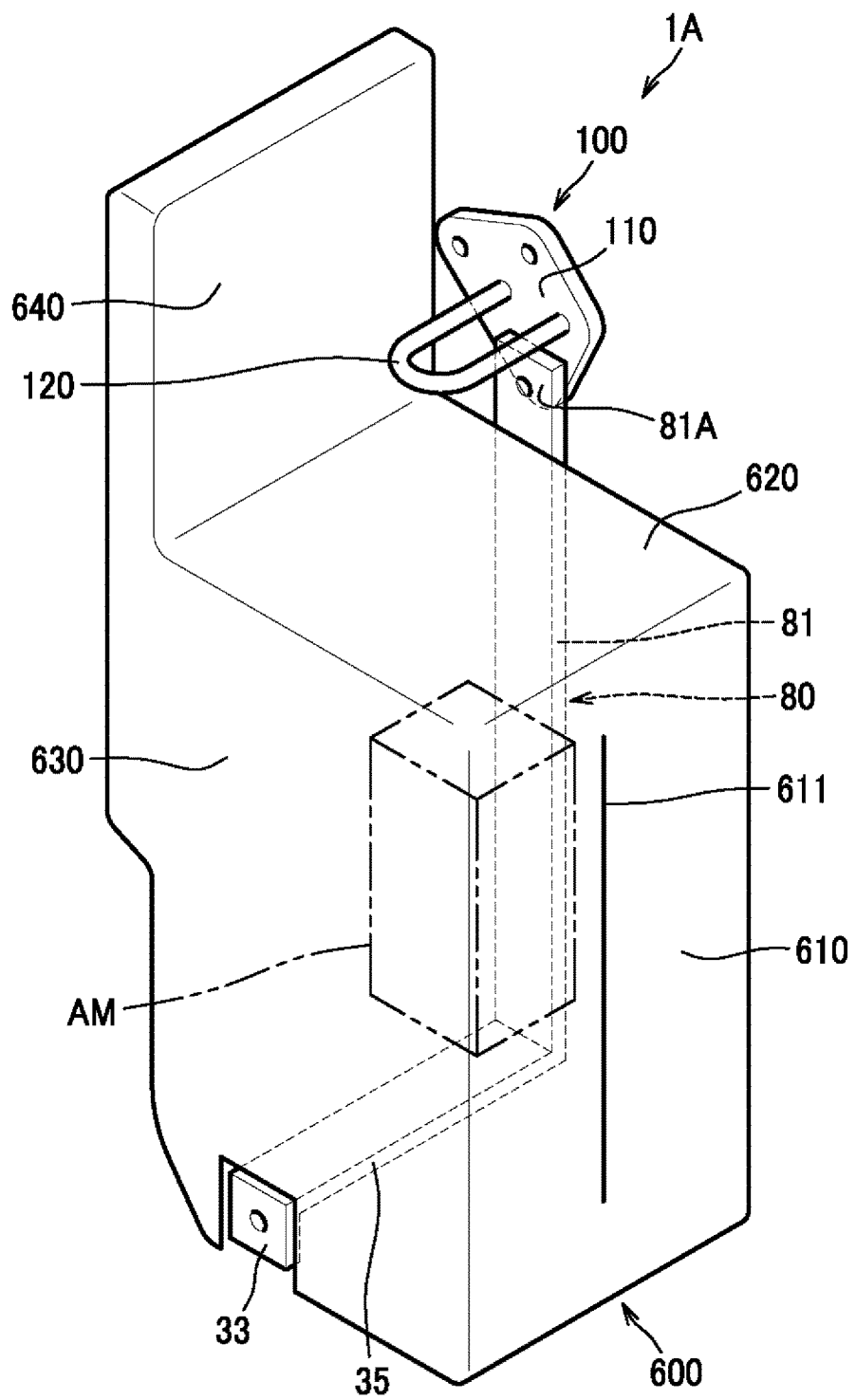
FIG. 7 is a perspective view of a rear side airbag device, showing a second modified example.

To address this issue, a rear side airbag device 1A comprising a cushion pad 600 as shown in FIG. 7 may be utilized. To be more specific, the cushion pad 600 shown in FIG. 7 includes a front wall 610, an upper wall 620, a side wall 630, and a screen 640.

The front wall 610 is a wall that covers the front side of the airbag module AM, and is formed in a shape of a rectangular plate elongate in the upward-downward direction. The front wall 610 has a slit 611 formed therein which allows the airbag 2 to deploy frontward.

The upper wall 620 is a wall that covers the upper side of the airbag module AM, and extends from an upper end of the front wall 610 rearward. The upper wall 620 is located under the striker 100 when the rear side airbag device 1A has been mounted in the vehicle body.

The side wall 630 is a wall that covers the laterally inner side of the airbag module AM, and is located adjacent to the laterally inner ends of the front wall 610 and the upper wall 620.

The screen 640 is a wall that covers the rear side of the striker 100 when the rear side airbag device 1A has been mounted in the vehicle body. The screen 640 extends from the rear end of the upper wall 620 upward.

The screen 640 provided in the rear side airbag device 1A as described above can serve to keep its improved aesthetic design in that when the tail gate of the vehicle is opened, the striker 100 hidden behind the screen 640 is not visible to a passenger.

In the configuration shown in FIG. 7, the mounting bracket 80 includes a second anchor portion 33 and a second connecting portion 35 which are substantially the same as those illustrated in the above-described embodiment, as well as an inflator mount portion 81 different from that of the above-described embodiment. The inflator mount portion 81 extends from a laterally outer end of the second connecting portion 35 upward, and its end portion 81A protrudes from the upper wall 620 of the cushion pad 600 upward. This end portion 81A is an example of a first anchor portion, and is fastened together with the base bracket 110 of the striker 100 to the vehicle body.

It is to be understood that the wire frame and the outer covering member may be formed to conform to the shape of the cushion pad 600. Each of the fixing plates of the wire frame may be held, in such a manner as described in the above-described embodiment, between each anchor portion of the mounting bracket 80 and the base bracket 110 or the L-shaped bracket 300.

In the above-described embodiment, the first anchor portion 32 is fixed to the striker mount portion 230 (vehicle body), and the second anchor portion 33 is fixed to the L-shaped bracket 300; feasible alternatives may include, for example: a first anchor portion fixed to a member to be fixed to the vehicle body such as a wire frame; and/or a second anchor portion fixed directly to the vehicle body.

Although the above-described embodiment is configured such that the mounting bracket 30 in its entirety has a shape with a width thereof oriented in the front-rear direction narrower than a width of the airbag module AM in the front-rear direction, it may be at least part of the mounting bracket 30 that has a shape with a width thereof oriented in the front-rear direction narrower than the width of the airbag module AM in the front-rear direction. For example, it would be desirable that part of at least one of the inflator mount portion 31, the first anchor portion 32, the second anchor portion 33, the first connecting portion 34 and the second connecting portion 35 have a shape with a width thereof oriented in the front-rear direction narrower than the width of the airbag module AM in the front-rear direction.

Any of the elements explained above in relation to the exemplified embodiments and illustrative modified examples may be implemented in combination as desired.

The invention claimed is:

1. A rear side airbag device located between a vehicle body and a rear seat, the rear side airbag device comprising:
   an airbag module comprising:
      an airbag; and
      an inflator configured to supply gas into the airbag; and a mounting bracket to which the inflator is fixed, the mounting bracket comprising:
- an inflator mount portion to which the inflator is fixed; and
- an anchor portion to be fixed to another member, wherein the anchor portion is located on a laterally inner side with respect to the inflator mount portion, and wherein the anchor portion is fastened together with a striker for retaining a seat back of the rear seat in an upright position, and fixed to the vehicle body.

2. The rear side airbag device according to claim 1, wherein the mounting bracket further comprises another anchor portion located on a laterally inner side with respect to the anchor portion.

3. The rear side airbag device according to claim 1, wherein the anchor portion is located above or below the inflator mount portion.

4. The rear side airbag device according to claim 3, wherein the mounting bracket further comprises a wall located either over the airbag module to connect an upper end of the inflator mount portion and the anchor portion located above the inflator mount portion or under the airbag module to connect a lower end of the inflator mount portion and the anchor portion located below the inflator mount portion.

5. The rear side airbag device according to claim 1, wherein the anchor portion has a shape with a width thereof oriented in a front-rear direction narrower than a width of the airbag module in the front-rear direction.

6. The rear side airbag device according to claim 4, wherein the wall has a shape with a width thereof oriented in a front-rear direction narrower than a width of the airbag module in the front-rear direction.

7. The rear side airbag device according to claim 1, wherein the inflator mount portion has a shape with a width thereof oriented in a front-rear direction narrower than a width of the airbag module in the front-rear direction.

8. A rear side airbag device located between a vehicle body and a rear seat, the rear side airbag device comprising:
- an airbag module comprising:
  - an airbag; and
  - an inflator configured to supply gas into the airbag; and
- a mounting bracket to which the inflator is fixed, the mounting bracket comprising:
  - an inflator mount portion to which the inflator is fixed; and
  - an anchor portion to be fixed to another member, wherein the anchor portion is located on a laterally inner side with respect to the inflator mount portion, wherein the anchor portion is located above or below the inflator mount portion, wherein the mounting bracket further comprises a wall located either over the airbag module to connect an upper end of the inflator mount portion and the anchor portion located above the inflator mount portion, or under the airbag module to connect a lower end of the inflator mount portion and the anchor portion located below the inflator mount portion, and wherein the wall is sloped with respect to a lateral direction and extends from the inflator mount portion obliquely upward or downward.

9. The rear side airbag device according to claim 6, further comprising a cushion pad that covers front, upper and laterally inner sides of the airbag module, wherein the striker comprises a base bracket to be fixed to the vehicle body, and a striker shaft protruding from the base bracket laterally inward, and wherein the cushion pad includes a screen that hides the striker from rear view.

10. A method for manufacturing a vehicle with a rear side airbag device located between a vehicle body and a rear seat, comprising:
- providing an airbag module comprising:
  - an airbag; and
  - an inflator configured to supply gas into the airbag;
- providing a mounting bracket comprising:
  - an inflator mount portion; and
  - an anchor portion located on a laterally inner side with respect to the inflator mount portion;
- providing a striker for retaining a seat back of the rear seat in an upright position;
- fixing the inflator to the inflator mount portion;
- fixing the striker to the vehicle body; and
- fastening the anchor portion together with the striker to fix the anchor portion to the vehicle body.

* * * * *